United States Patent
Wallace et al.

(10) Patent No.: US 11,549,623 B2
(45) Date of Patent: Jan. 10, 2023

(54) BALL JOINT SEAL

(71) Applicant: Freudenberg Oil & Gas, LLC, Houston, TX (US)

(72) Inventors: Brian A. Wallace, Kingwood, TX (US); Reza Payvar, Ancaster (CA)

(73) Assignee: Freudenberg Oil & Gas, LLC, Houston, TX (US)

( * ) Notice: Subject to any disclaimer, the term of this patent is extended or adjusted under 35 U.S.C. 154(b) by 344 days.

(21) Appl. No.: 16/826,564

(22) Filed: Mar. 23, 2020

(65) Prior Publication Data
US 2021/0293336 A1   Sep. 23, 2021

(51) Int. Cl.
| | |
|---|---|
| F16L 27/04 | (2006.01) |
| F16J 15/02 | (2006.01) |
| F16L 27/073 | (2006.01) |
| F16L 27/06 | (2006.01) |
| E21B 33/12 | (2006.01) |
| F16L 17/06 | (2006.01) |

(52) U.S. Cl.
CPC .............. *F16L 27/04* (2013.01); *F16J 15/024* (2013.01); *F16L 27/06* (2013.01); *F16L 27/073* (2013.01); *E21B 33/1208* (2013.01); *E21B 2200/01* (2020.05); *F16L 17/063* (2013.01)

(58) Field of Classification Search
CPC ......... F16L 27/04; F16L 27/06; F16L 27/073; F16J 15/022; F16J 15/024; F16J 15/18; F16J 15/20; E21B 2200/01; E21B 33/1208
See application file for complete search history.

(56) References Cited

U.S. PATENT DOCUMENTS

| | | | | |
|---|---|---|---|---|
| 900,603 | A * | 10/1908 | Silk ........................ | F16L 27/053 285/356 |
| 908,414 | A * | 12/1908 | Mellin ................... | F16L 39/005 285/271 |
| 1,563,161 | A * | 11/1925 | Christenson .......... | F16L 27/053 285/271 |

(Continued)

FOREIGN PATENT DOCUMENTS

| | | |
|---|---|---|
| EP | 1043526 A2 | 10/2000 |
| EP | 3141789 A2 | 3/2017 |

OTHER PUBLICATIONS

Freudenberg Oil & Gas Technologies, "Flexible connector providing up to 30 degrees total flex capability and 360 degrees rotational freedom"; https://www.fogt.com/flexball (6 pages).

(Continued)

*Primary Examiner* — Nicholas L Foster
(74) *Attorney, Agent, or Firm* — Daniel J. Sepanik, Esq.; Harness, Dickey & Pierce, P.L.C.

(57) ABSTRACT

The pipe ball joint includes a casing having a socket portion with a substantially spherical interior surface and a first pipe segment extending from the socket portion. The socket portion has an annular groove disposed adjacent the partially spherical interior surface. A ball pipe section includes a ball segment received in the socket portion of the casing and a second pipe segment extending from the ball segment. A seal assembly is received in the annular groove of the casing and is disposed against the ball segment of the ball pipe section. The seal assembly includes a plurality of nested seal rings that each include a concave face and a convex face.

2 Claims, 2 Drawing Sheets

(56) References Cited

U.S. PATENT DOCUMENTS

Figure 1:
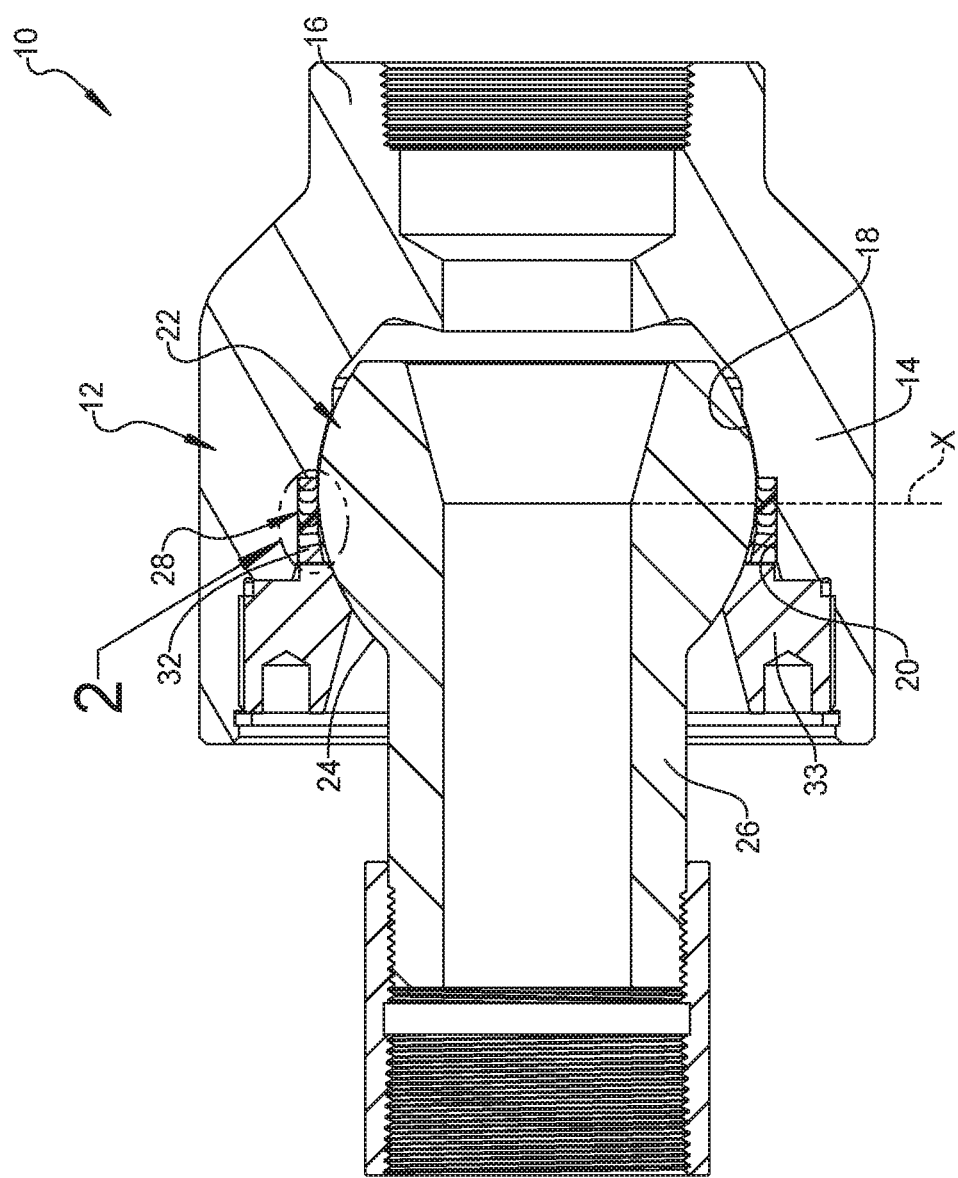

| | | | | |
|---|---|---|---|---|
| 1,784,926 | A * | 12/1930 | Christenson | F16L 27/053 285/271 |
| 2,550,536 | A * | 4/1951 | Delano, Jr. | F16L 27/053 285/267 |
| 3,586,341 | A * | 6/1971 | Whittaker | F16J 15/20 277/553 |
| 3,790,179 | A * | 2/1974 | Scannell | F16J 15/20 277/564 |
| 3,891,246 | A | 6/1975 | Hopper | |
| 3,951,418 | A | 4/1976 | Dryer | |
| 4,045,054 | A * | 8/1977 | Arnold | F16L 1/26 285/308 |
| 4,069,682 | A * | 1/1978 | Taylor | E21B 43/017 405/210 |
| 4,186,950 | A * | 2/1980 | Billingsley | F16L 27/053 285/321 |
| 4,811,959 | A | 3/1989 | Bullard et al. | |
| 5,127,681 | A | 7/1992 | Helen et al. | |
| 5,297,805 | A | 3/1994 | Merkin et al. | |
| 5,309,993 | A | 5/1994 | Coon et al. | |
| 9,341,039 | B2 * | 5/2016 | Galle | F16J 15/18 |
| 2009/0065726 | A1 | 3/2009 | Hostetter et al. | |
| 2010/0156096 | A1 | 6/2010 | Challender et al. | |
| 2013/0087977 | A1 * | 4/2013 | Galle | F16J 15/26 277/323 |
| 2014/0291937 | A1 * | 10/2014 | Grimanis | F16J 15/18 277/308 |
| 2014/0345850 | A1 * | 11/2014 | Galle | F16J 15/189 166/84.1 |
| 2017/0051738 | A1 * | 2/2017 | Horning | F04B 53/02 |
| 2017/0074439 | A1 * | 3/2017 | Marincic | F16L 27/073 |

OTHER PUBLICATIONS

International Search Report and Written Opinion regarding International Application No. PCT/US2021/015356, dated Apr. 13, 2021.

* cited by examiner

BALL JOINT SEAL

FIELD

The present disclosure relates to a ball joint pipe coupling with a ball joint seal for connecting misaligned pipes in fluid-tight communication.

BACKGROUND

This section provides background information related to the present disclosure which is not necessarily prior art.

It is common in industries such as oil and gas production to utilize a ball and socket-type dynamic joint to join two misaligned pipe ends, where pipe movement cannot be avoided, to therefore prevent the over stressing of pipe components. Ball and socket-type dynamic joints add complexity to the internal joint design as well as the seal design. The assembly of the ball and socket-type joint can be complicated by high friction of the seal components inhibiting the motion of the ball and socket-type dynamic joint. Accordingly, it is desirable to provide an improved ball and socket joint with a seal that provides reduced friction during assembly.

SUMMARY

This section provides a general summary of the disclosure, and is not a comprehensive disclosure of its full scope or all of its features.

The present disclosure provides a ball pipe joint design with reduced friction during assembly and improved sealing under pressure. The pipe ball joint includes a casing having a socket portion with a substantially spherical interior surface and a first pipe segment extending from the socket portion. The socket portion has an annular groove disposed adjacent the partially spherical interior surface. A ball pipe section includes a ball segment received in the socket portion of the casing and a second pipe segment extending from the ball segment. A seal assembly is received in the annular groove of the casing and is disposed against the ball segment of the ball pipe section. The seal assembly includes a plurality of nested seal rings that are chevron-shaped in cross section. The chevron-shaped seal rings each have a convex face directed in a first axial direction and a concave face directed in a second opposite axial direction. The concave face includes a recessed surface that can include a pair of tapered surfaces that terminate at a floor surface. The convex face includes a protruding surface that can include a pair of tapered surfaces that terminate at a peak surface. A first end ring includes a convex portion received in a concave face of a first end one of the plurality of chevron-shaped seal rings. A second end ring includes a concave face that receives a convex face of a second end one of the plurality of chevron-shaped seal rings. A retainer is secured to the casing encompassing the ball pipe, and is disposed against an axial end of the seal assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
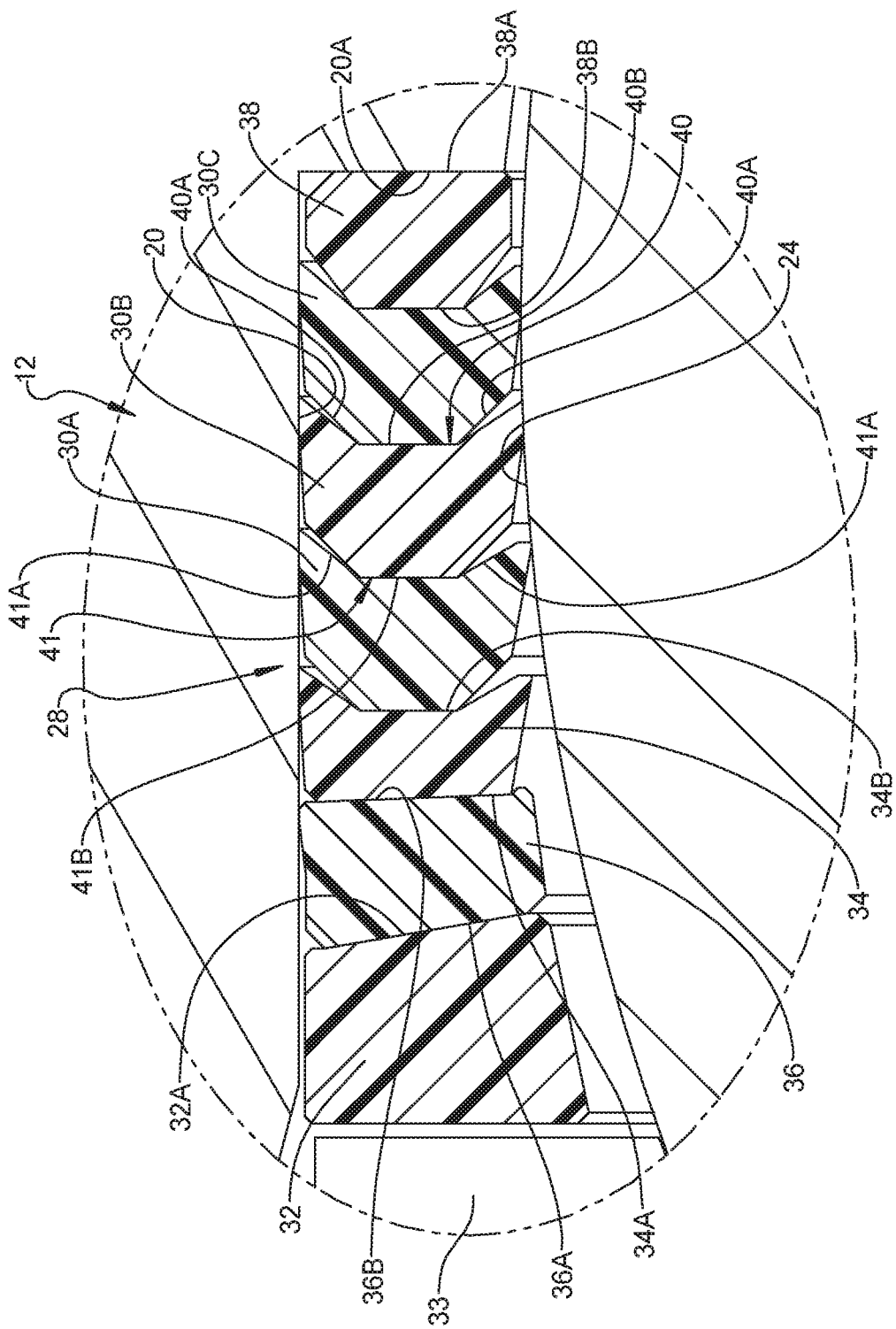

FIG. 1 is a cross-sectional view of an exemplary pipe ball joint according to the principles of the present disclosure; and FIG. 2 is a detailed cross-sectional view of the seal assembly according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a pipe ball joint 10 according to the principles of the present disclosure will now be described. The pipe ball joint 10 includes a casing 12 having a socket portion 14 and a pipe segment 16 extending from the socket portion 14. The socket portion 14 has an interior surface portion 18 that is substantially spherical. The socket portion 14 also includes an annular groove 20 disposed adjacent the substantially spherical interior surface portion 18. A ball pipe section 22 includes a substantially spherical ball-shaped segment 24 which is received in the partially spherical interior surface portion 18 of the socket portion 14 and a pipe segment 26 extending from the ball-shaped segment 24.

A seal assembly 28 is received in the annular groove 20 of the socket portion 14 and is disposed against an outer spherical surface of the ball-shaped segment 24 of the ball pipe section 22. Accordingly, the seal assembly seals against a cylindrical surface on its outer perimeter and a spherical surface on its inner perimeter. As best shown in FIG. 2, the seal assembly 28 can include a packing of multiple nested seal elements 30A-C that can be chevron-shaped or V-shaped in cross section. The chevron-shaped or V-shaped cross section of the seal elements 30A-C provides the seal elements 30A with a concave face 40 and a convex face 41 (only one of each of which are labeled in FIG. 2). The concave face 40 includes a recessed surface that can include a pair of tapered side surfaces 40A that terminate at a flat, rounded or angled floor surface 40B. The convex face 41 includes a protruding surface that can include a pair of tapered side surfaces 41A that terminate at a flat, rounded or angled floor peak surface 41B. The seal elements 30A-C can be made from a thermoplastic or an elastomeric material. A push ring 32 is disposed against the seal assembly 28 and a retainer 33 is secured to the casing 12 for retaining the ball pipe section 24 within the socket portion 14. It should be understood that although the push ring 32 and the retainer 33 are shown as separate members, the push ring 32 can be formed integral with the retainer 33. The seal assembly 28 can include primary enforcement ring 34 and a secondary enforcement ring 36 that are disposed between the push ring 32 and the seal elements 30A-C. The primary enforcement ring 34 can include a concave face 34B that receives a convex face 40 of the seal element 30A. The secondary enforcement ring 36 can include a planar surface 36A disposed against a planar face 32A of the push ring 32 and a planar face 36B receiving a planar face 34A of the primary enforcement ring 33. An end ring 38 is disposed between the seal elements 30A-C and an end wall 20A of the annular groove 20. The end ring 38 can include a planar surface 38A engaging the end wall 20A of the annular groove 20 and a convex surface 38B received in a concave surface 40 of the seal element 30C. The primary and secondary enforcement rings 34, 36 and the end ring 38 can be made from a thermoplastic material or from metal.

The pipe ball joint 10 is assembled by placing the seal assembly 28 within the casing 12. The ball pipe section 22 can then be inserted into the casing 12 and the push ring 32 is placed on top of the seal assembly 28. The retainer 33 is then installed on top and the seal assembly 28 is pressed together. The retainer 33 can be secured to the casing 12 by a threaded connection or by other known connection techniques.

A challenge for designing a seal of a ball joint is to allow the seal to be axially compressed upon assembly while obtaining a sealing engagement in a radially outer direction against the inner cylindrical surface of the annular groove 20 and in a radially inner direction against the outer spherical surface of the ball pipe section 22. Because of the changing dimension of the outer spherical surface of the ball pipe section, the chevron-shaped seals 30A-C of the present seal assembly 28 compress to a point until they uniquely expand both radially inward and outward direction to seal tightly against the ball pipe section 22. The ball pipe section 22 has a center axis (shown with a dashed line X) with at least one seal element 30A to the left of the center axis X and at least one seal element 30C to the right of the center axis X. In FIG. 2, the ball section 22 will tend to move left when pressure is introduced to the system due to the pressure thrust. This further increases the contact force on the seal 30A. Additionally, the pressure pushes the entire seal stack to the left as shown in FIG. 2, further wedging the seal 30C towards the apex and increasing the contact force on the seal 30C. As all of the seals 30A-C are of similar geometry, their exact location around the sphere/ball is not critical, so long as they sit on either side of the sphere's apex. While three nested seals 30A-C are shown, it should be understood more or fewer nested seals can be utilized. The seal orientation and geometry improves sealability at higher pressure while maintaining lower contact forces at lower pressures to improve joint flexibility.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pipe ball joint, comprising:
a casing having a socket portion with a substantially spherical interior surface, the casing including a pipe section extending therefrom;
a ball pipe section including a substantially spherical ball segment received in the socket portion;
a seal assembly received in an annular groove of the socket portion and disposed internally against the substantially spherical ball segment of the ball pipe section and externally against a cylindrical inner surface of the annular groove of the socket portion, the seal assembly including a plurality of nested chevron-shaped seal rings each having a concave face and a convex face, wherein the convex face of at least two of the nested chevron-shaped seal rings is received in the concave face of a respective one of an adjacent nested chevron-shaped seal ring, wherein the concave face of the plurality of nested chevron-shaped seal rings includes a recessed surface including a pair of tapered side surfaces and a floor surface and the convex face of the plurality of nested chevron-shaped seal rings includes a protruding surface including a pair of tapered side surfaces and a peak surface;
a push ring disposed against the seal assembly;
a first enforcement ring disposed between the push ring and the plurality of nested chevron-shaped seal rings, and the first enforcement ring including a concave face receiving the convex face of one of the plurality of nested chevron-shaped seal rings;

a second enforcement ring opposing the first enforcement ring and the push ring; and an end ring disposed against the plurality of nested chevron-shaped seal rings and including a convex portion received in a concave portion of an end one of the plurality of nested chevron-shaped seal rings, the end ring including a planar surface engaging an end wall of the annular groove.

2. A pipe ball joint, comprising:

a casing having a socket portion with a substantially spherical interior surface, the casing including a pipe section extending therefrom;

a ball pipe section including a substantially spherical ball segment received in the socket portion, wherein an open end of the ball pipe section faces in a direction of the pipe section of the casing;

a seal assembly received in an annular groove of the socket portion and disposed internally against the substantially spherical ball segment of the ball pipe section and externally against a cylindrical inner surface of the annular groove of the socket portion, the seal assembly including a plurality of nested chevron-shaped seal rings each having a concave face, a convex face, an inner peripheral face and an outer peripheral face, wherein the convex face of the nested chevron-shaped seal rings includes a tapered outer side surface extending radially inwardly directly from the outer peripheral face at an obtuse angle and a tapered inner side surface extending radially outwardly directly from the inner peripheral face at an obtuse angle and the concave face of that at least two of the nested chevron-shaped seal rings include a tapered outer side surface extending radially inwardly directly from the outer peripheral face at an acute angle and a tapered inner side surface extending radially outwardly directly from the inner peripheral face at an acute angle and wherein the convex face of at least two of the chevron-shaped seal rings is received in the concave face of a respective one of an adjacent nested chevron-shaped seal ring, and wherein the concave face of the nested chevron-shaped seal rings face in the direction of the pipe section of the casing.

\* \* \* \* \*